United States Patent
Xie et al.

(10) Patent No.: US 11,588,410 B2
(45) Date of Patent: *Feb. 21, 2023

(54) SWITCHED MODE POWER SUPPLIES WITH CONFIGURABLE COMMUNICATION ADDRESSES

(71) Applicant: Astec International Limited, Kowloon (HK)

(72) Inventors: Yongtao Xie, Shenzhen (CN); Pengfei Cai, Shenzhen (CN); Shaobo Li, Shenzhen (CN); Zhanwu Wang, Shenzhen (CN)

(73) Assignee: Astec International Limited, Kowloon (HK)

( * ) Notice: Subject to any disclaimer, the term of this patent is extended or adjusted under 35 U.S.C. 154(b) by 65 days.

This patent is subject to a terminal disclaimer.

(21) Appl. No.: 17/197,376

(22) Filed: Mar. 10, 2021

(65) Prior Publication Data

US 2021/0203240 A1 Jul. 1, 2021

Related U.S. Application Data

(63) Continuation of application No. 16/341,543, filed as application No. PCT/CN2018/097803 on Jul. 31, 2018, now Pat. No. 10,985,666.

(51) Int. Cl.
 *H02M 3/335* (2006.01)
(52) U.S. Cl.
 CPC .............................. *H02M 3/33592* (2013.01)

(58) Field of Classification Search
 CPC ................... H02M 3/33592; H02M 1/08–096
 See application file for complete search history.

(56) References Cited

U.S. PATENT DOCUMENTS

| | | | |
|---|---|---|---|
| 9,935,559 B2 | 4/2018 | Kong et al. | |
| 10,985,666 B2* | 4/2021 | Xie | H02M 3/33592 |
| 2009/0284995 A1 | 11/2009 | Sato | |
| 2014/0268915 A1 | 9/2014 | Kong et al. | |
| 2018/0062530 A1 | 3/2018 | Kong et al. | |

FOREIGN PATENT DOCUMENTS

| | | |
|---|---|---|
| CN | 102497105 A | 6/2012 |
| CN | 102231605 B | 12/2013 |
| CN | 104980029 B | 10/2017 |

\* cited by examiner

*Primary Examiner* — Rafael O De Leon Domenech

(57) ABSTRACT

A switched-mode power supply includes an input, an output, and a transformer including primary and secondary windings. The power supply also includes a synchronous rectifier coupled to selectively conduct current through the secondary winding of the transformer. The synchronous rectifier includes a source, a gate and a drain terminal. The power supply further includes a controller having a supply voltage terminal and a gate terminal to supply a control signal to the gate of the synchronous rectifier, and a circuit coupled between the supply voltage terminal of the controller and at least one of the gate terminal of the controller and the drain terminal of the synchronous rectifier to supply power from the gate terminal of the controller or the drain terminal of the synchronous rectifier to the supply voltage terminal of the controller. Methods of supplying power in switched-mode power supplies are also disclosed.

20 Claims, 7 Drawing Sheets

SWITCHED MODE POWER SUPPLIES WITH CONFIGURABLE COMMUNICATION ADDRESSES

CROSS-REFERENCE TO RELATED APPLICATIONS

This application claims the benefit of and priority to U.S. application Ser. No. 16/341,543 filed Apr. 12, 2019, which is a 371 of and claims the benefit and priority of PCT/CN2018/097803 filed Jul. 31, 2018. The entire disclosures of the above applications are incorporated herein by reference.

FIELD

The present disclosure relates to voltage supplies for synchronous rectifier controllers during low voltage output conditions.

BACKGROUND

This section provides background information related to the present disclosure which is not necessarily prior art.

In low output voltage applications of switched-mode power supplies, synchronous rectification is often used to optimize efficiency. Synchronous rectifier controllers are typically used for better timing control of synchronous rectifiers. A supply voltage supply for the controller may be derived from an output of the power supply if the output voltage is high enough to satisfy an operating supply voltage of the controller.

If the output voltage is too low (e.g., less than about five volts, etc.), a pulse linear regulator may be used to reduce a drain voltage of a synchronous rectifier to a stable supply voltage for operating the controller. Alternatively, an auxiliary winding of a transformer may be used to supply the supply voltage for operating the controller.

SUMMARY

This section provides a general summary of the disclosure, and is not a comprehensive disclosure of its full scope or all of its features.

According to one aspect of the present disclosure, a switched-mode power supply comprises an input for receiving an input voltage from a voltage source, an output for supplying a DC output voltage to a load, and a transformer coupled between the input and the output, the transformer having a primary winding and a secondary winding. The power supply also comprises a controller and a synchronous rectifier coupled to selectively conduct current through the secondary winding of the transformer. The synchronous rectifier comprises a source, a gate, and a drain terminal. The controller comprises a supply voltage terminal to receive a supply voltage for the controller, and a gate terminal to supply a control signal to the gate of the synchronous rectifier. The controller also comprises a circuit coupled between the supply voltage terminal of the controller and at least one of the gate terminal of the controller and the drain terminal of the synchronous rectifier to supply power from the gate terminal of the controller or the drain terminal of the synchronous rectifier to the supply voltage terminal of the controller. The circuit comprises a first capacitor and a buffer coupled between a first terminal of the first capacitor, the output, and the gate terminal of the controller. The buffer comprises at least two buffer switches.

Another aspect of the present disclosure comprises a method of supplying power in a switched-mode power supply. The switched-mode power supply comprises an input, an output, a transformer coupled between the input and the output, a synchronous rectifier comprises a drain terminal, a synchronous rectifier controller comprising a supply voltage terminal and a gate terminal, and a circuit coupled between the supply voltage terminal of the controller and the gate terminal of the controller. The method comprises supplying, via the gate terminal of the controller, a control signal to a gate of the synchronous rectifier to selectively conduct current through a winding of the transformer and supplying, via the circuit, power from the gate terminal of the controller or the drain terminal of the synchronous rectifier to the supply voltage terminal of the controller. The circuit comprises a first capacitor, a first diode, and a buffer comprises two switches. The buffer is coupled between a first terminal of the first capacitor and the gate terminal of the controller. The method further comprises charging the first capacitor to a DC output voltage minus a forward voltage of the first diode and minus a saturation voltage of one of buffer switches in response to the control signal at the gate terminal of the controller having a logical low value.

Another aspect of the present disclosure comprises a method of supplying power in a switched-mode power supply. The switched-mode power supply comprises an input, an output, a transformer coupled between the input and the output, a synchronous rectifier comprises a drain terminal, a synchronous rectifier controller comprising a supply voltage terminal and a gate terminal, and a circuit coupled between the supply voltage terminal of the controller and the drain of the synchronous rectifier. The method comprises supplying, via the gate terminal of the controller, a control signal to a gate of the synchronous rectifier to selectively conduct current through a winding of the transformer and supplying, via the circuit, power from the gate terminal of the controller or the drain terminal of the synchronous rectifier to the supply voltage terminal of the controller. The circuit comprises a first capacitor, a first diode, and a buffer comprises two switches. The buffer is coupled between a first terminal of the first capacitor and the drain of the synchronous rectifier. The method further comprises charging the first capacitor to a DC output voltage minus a forward voltage of the first diode and minus a saturation voltage of one of buffer switches in response to the control signal at the gate terminal of the controller having a logical low value.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts or features throughout the several views of the drawings.

DETAILED DESCRIPTION

Figure 1:
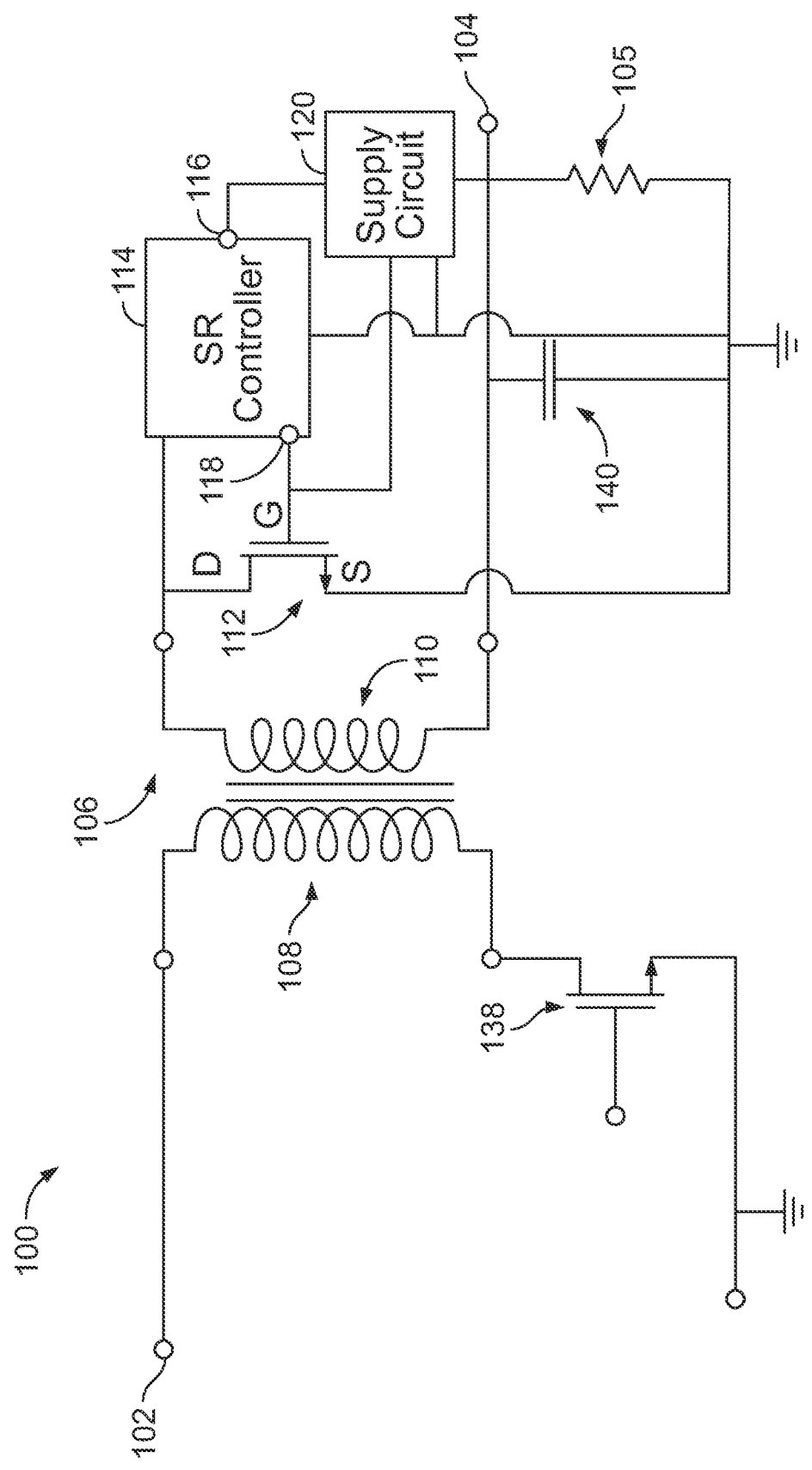
FIG. 1 is a block diagram of a switched-mode power supply, according to one example embodiment of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

A switched-mode power supply (SMPS) according to one example embodiment of the present disclosure is illustrated in FIG. 1 and indicated generally by reference number 100. The power supply 100 includes an input 102 for receiving a DC input voltage from a voltage source, an output 104 for supplying a DC output voltage to a load 105, and a transformer 106 coupled between the input 102 and the output 104. The transformer 106 has a primary winding 108 and a secondary winding 110.

The power supply 100 also includes a synchronous rectifier 112 and a controller 114. The synchronous rectifier 112 includes a drain terminal (D), a source (S) and a gate (G), and is coupled to selectively conduct current through the secondary winding 110 of the transformer 106. The controller 114 includes a supply voltage terminal 116 and a gate terminal 118. The gate terminal 118 is coupled to supply a control signal to the gate (G) of the synchronous rectifier 112.

As shown in FIG. 1, the power supply 100 includes a circuit 120 coupled between the gate terminal 118 of the controller 114 and the supply voltage terminal 116 of the controller 114. The circuit 120 supplies power from the gate terminal 118 of the controller 114 to the supply voltage terminal 116 of the controller 114.

The circuit 120 is also coupled between the output 104 and the supply voltage terminal 116 of the controller 114 to supply power from the output 104 to the supply voltage terminal 116 of the controller 114. In this arrangement, the circuit 120 can use the control signal at the at the gate terminal 118 of the controller 114 to boost the DC output voltage used as the controller supply voltage, when the DC output voltage is low.

The DC output voltage may sometimes be lower than an operating supply voltage of the controller 114, such as during startup of the power supply 100, during a light load condition, etc. For example, the operating supply voltage of the controller 114 may be any suitable voltage value (e.g., about 5 V, 12 V, etc.) required by the controller 114 for proper operation of circuitry, etc. of the controller 114.

When the DC output voltage at the output 104 is lower than the operating supply voltage of the controller 114, the circuit 120 can use the control signal at the gate terminal 118 of the controller 114 to boost the DC output voltage supplied by the circuit 120 to the supply voltage terminal 116 of the controller 114.

Figure 2:
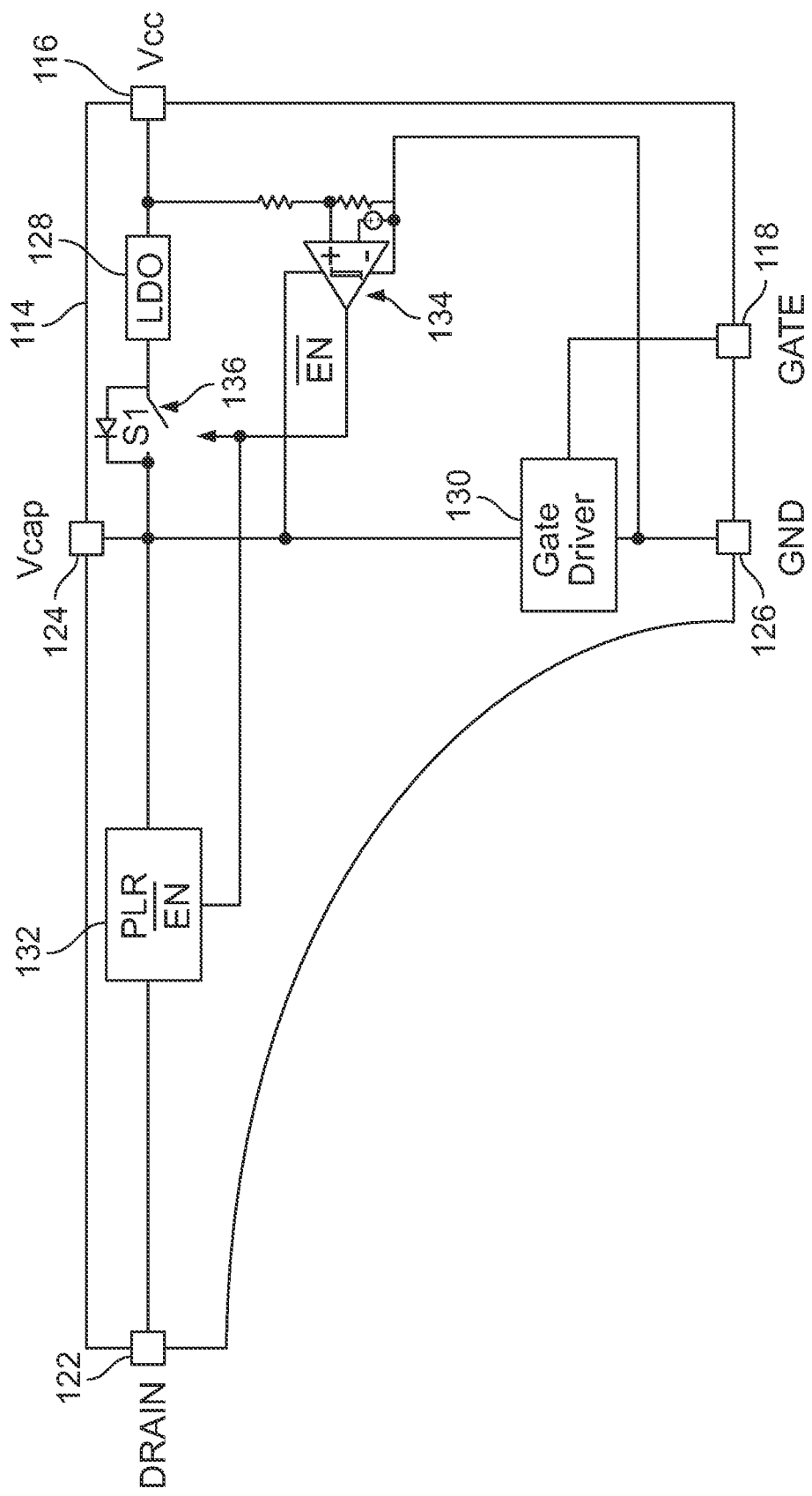
FIG. 2 is a block diagram of a controller of the power supply of FIG. 1.

FIG. 2 illustrates an internal wiring diagram of a portion of the controller 114. As shown in FIG. 2, the controller 114 includes a drain terminal 122, a capacitor supply terminal 124, and a ground terminal 126. A low-dropout (LDO) regulator 128 is coupled between the supply voltage terminal 116 and the capacitor supply terminal 124.

The LDO regulator 128 can supply a stable voltage at the capacitor supply terminal 124 for internal circuitry of the controller 114. For example, the LDO regulator 128 can convert a supply voltage at the supply voltage terminal 116 to a stable output at the capacitor supply terminal 124 for a wide range of DC output voltage values, so the capacitor supply terminal 124 can provide a stable operating voltage (e.g., about 5 V, 12 V, etc.) for proper operation of internal circuitry of the controller 114.

The controller includes a gate driver 130 to provide the control signal to the gate (G) of the synchronous rectifier 112 shown in FIG. 1. The gate driver 130 may receive a supply voltage for generating the control signal from the capacitor supply terminal 124, and can supply the control signal to the synchronous rectifier 112 via the gate terminal 118 of the controller 114.

The control signal may be any suitable signal for controlling operation of the synchronous rectifier 112. For example, the control signal may be a pulse-width modulated (PWM) signal having logical high values (e.g., about 5V, etc.) and logical low values (e.g., about zero volts, etc.). Because the circuit 120 is coupled between the gate terminal 118 and the supply voltage terminal 116, the circuit 120 can use the voltage of the control signal supplied to the synchronous rectifier 112 to boost the DC output voltage used as a supply voltage for the controller 114.

As shown in FIG. 2, the controller 114 includes a pulse linear regulator 132. The pulse linear regulator 132 is coupled to receive a voltage from the drain terminal (D) of the synchronous rectifier 112 via the drain terminal 122 of the controller 114. The pulse linear regulator 132 can reduce the voltage from the drain terminal (D) to supply a reduced voltage to the capacitor supply terminal 124. The terminal may be any suitable electrical connection, including an electrical connector, a wire, a node, etc.

In this approach, the pulse linear regulator 132 can supply a stable voltage to the capacitor supply terminal 124 when the DC output voltage is lower than the operating supply voltage of the controller 114. However, the pulse linear regulator 132 can create a high power loss due to a high voltage at the drain terminal (D) of the synchronous rectifier, which can significantly affect light load efficiency or efficiency of a low output power application of the power supply 100.

Because the pulse linear regulator 132 can cause significant power loss in low output voltage application of the power supply 100, some power supplies use an auxiliary winding of the transformer to supply a supply voltage to the supply voltage terminal 116 of the controller 114. However, this approach requires additional transformer winding(s) and printed circuit board (PCB) space for additional pin outs and components.

The inventors herein have recognized that the circuit 120 can reduce the use of the pulse linear regulator 132, while adding minimal additional circuit components and space, by using the voltage of the control signal to the synchronous rectifier 112 to supply power to the supply voltage terminal 116 of the controller 114. Embodiments described herein can provide cost-effective, high efficiency methods for boosting the supply voltage supplied to the controller 114, which reduces the need for use of the pulse linear regulator 132.

For example, the controller 114 may include a comparator 134 and switch 136 that enable the pulse linear regulator 132 to supply the reduced voltage to the capacitor supply terminal 124 when a supply voltage at the supply voltage terminal 116 is below an operating supply voltage of the controller 114. When the supply voltage is at or above the operating supply voltage of the controller 114, the comparator 134 and switch 136 can disable the pulse linear regulator 132 to reduce power loss.

As one example, a power supply may have a DC output voltage of about 4.505 volts at a current of 0.52 amps. When the controller is only supplied from a drain of the synchronous rectifier, an efficiency of the power supply may be about 81.8%. When the circuit 120 is added to the power supply, the efficiency may increase to about 82.8%, for an efficiency improvement of 1.0%. These values are provided for purposes of illustration only, and other embodiments could have different efficiencies, different output voltage and current values, etc.

Referring back to FIG. 1, the power supply 100 includes a primary switch 138 for selectively conducting current in the primary winding 108. The power supply 100 also includes an output capacitor 140 for stabilizing the DC output voltage at the output 104. In other embodiments, any other suitable switched-mode power supply topologies may be used, including more or less switches and capacitors, switches and capacitors located in different circuit arrangements, etc.

Figure 3:
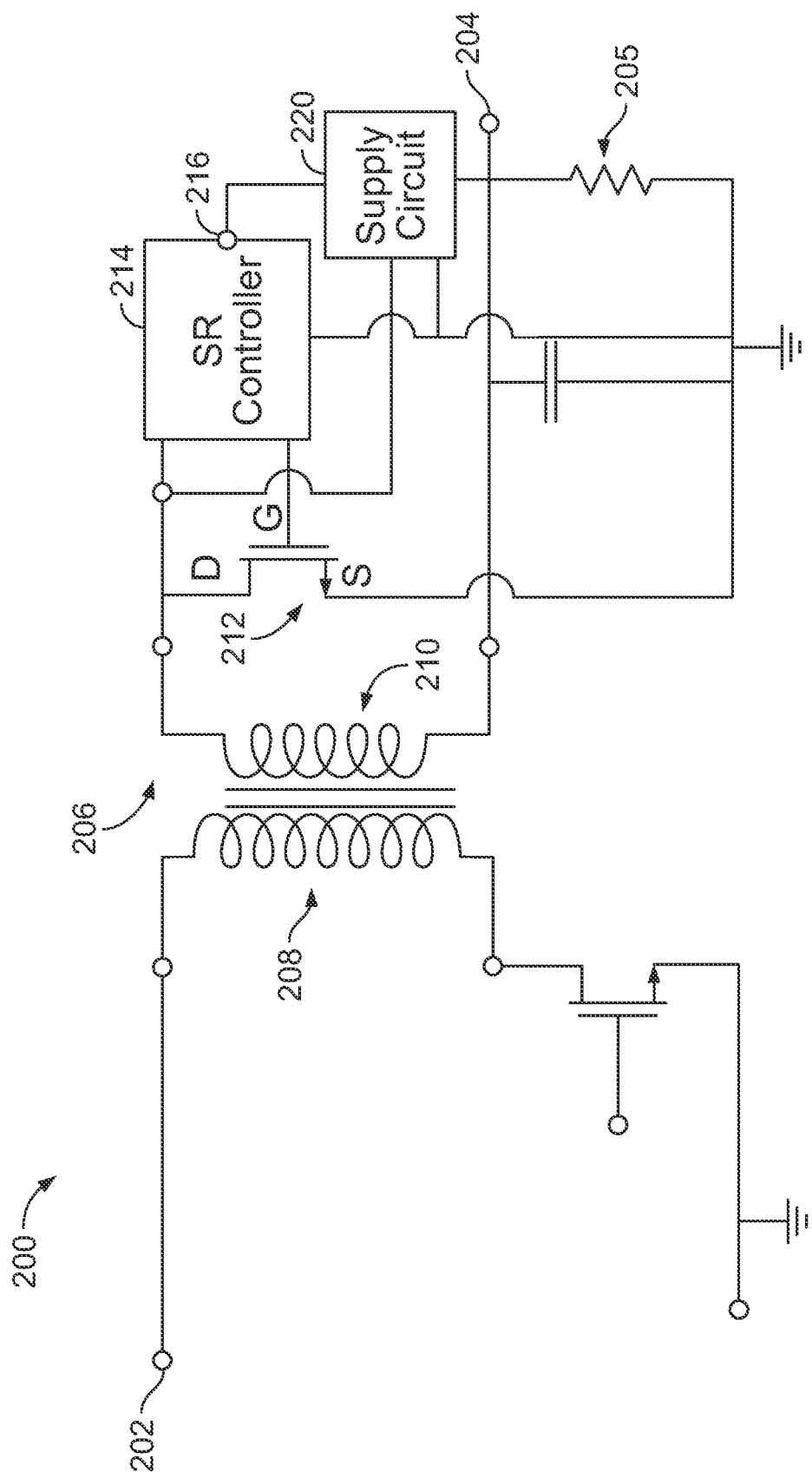
FIG. 3 is a block diagram of a switched-mode power supply including a voltage supply circuit coupled between a drain of a synchronous rectifier and a supply voltage terminal of a synchronous rectifier controller, according to another example embodiment of the present disclosure.

A switched-mode power supply according to another example embodiment of the present disclosure is illustrated in FIG. 3 and indicated generally by reference number 200. The power supply 200 includes an input 202, an output 204 for supplying a DC output voltage to a load 205, and a transformer 206 coupled between the input 202 and the output 204. The transformer 206 includes a primary winding 208 and a secondary winding 210. Although FIG. 3 illustrates the transformer 206 as including a single primary winding 208 and secondary winding 210, other embodiments may include multiple primary windings, multiple secondary windings, etc.

The power supply 200 also includes a synchronous rectifier 212 and a controller 214 (e.g., a synchronous rectifier controller, a secondary controller, etc.). The controller 214 includes a gate terminal 218 coupled to supply a control signal to a gate of the synchronous rectifier 212, to selectively conduct current through the secondary winding 210 of the transformer 206.

As shown in FIG. 3, a circuit 220 (e.g., supply circuit, etc.) is coupled between the drain terminal (D) of the synchronous rectifier 212, a supply voltage terminal 216 (e.g., Vcc) of the controller 214, and the output 204. The circuit 220 can supply power from the drain terminal (D) and the output 204 to the supply voltage terminal 216 of the controller 214. The circuit 220 may be referred to as a supply voltage circuit. The power supply 200 may be similar to the power supply 100 of FIG. 1, but the circuit 220 is coupled with the drain terminal (D) of the synchronous rectifier 212 instead of the gate terminal (G) of the synchronous rectifier 212.

The connection of the circuit 220 between the drain terminal (D) of the synchronous rectifier 212 and the supply voltage terminal 216 may be used when the controller 214 does not include a pulse linear regulator, as explained further below. For example, when the controller 214 does not include a pulse linear regulator (or other startup control), there may not be an initial bias voltage for the controller 214 to generate an initial gate drive PWM signal.

The arrangement of the circuit 220 can allow the synchronous rectifier 212 to operate in a diode mode at startup. A supply bias for the controller 214 can be established when the drain terminal (D) of the synchronous rectifier 212 is switching and a voltage at the output 204 starts to rise, so a pulse linear regulator or other startup scheme may not be necessary.

The drain (D) and gate (G) terminals of the synchronous rectifier 212 may each experience switching signals with respect to ground (GND). If the switching signals swing with sufficient amplitude and frequency, either may be used for boosting a supply voltage (VCC) of the controller 214.

Figure 4A:
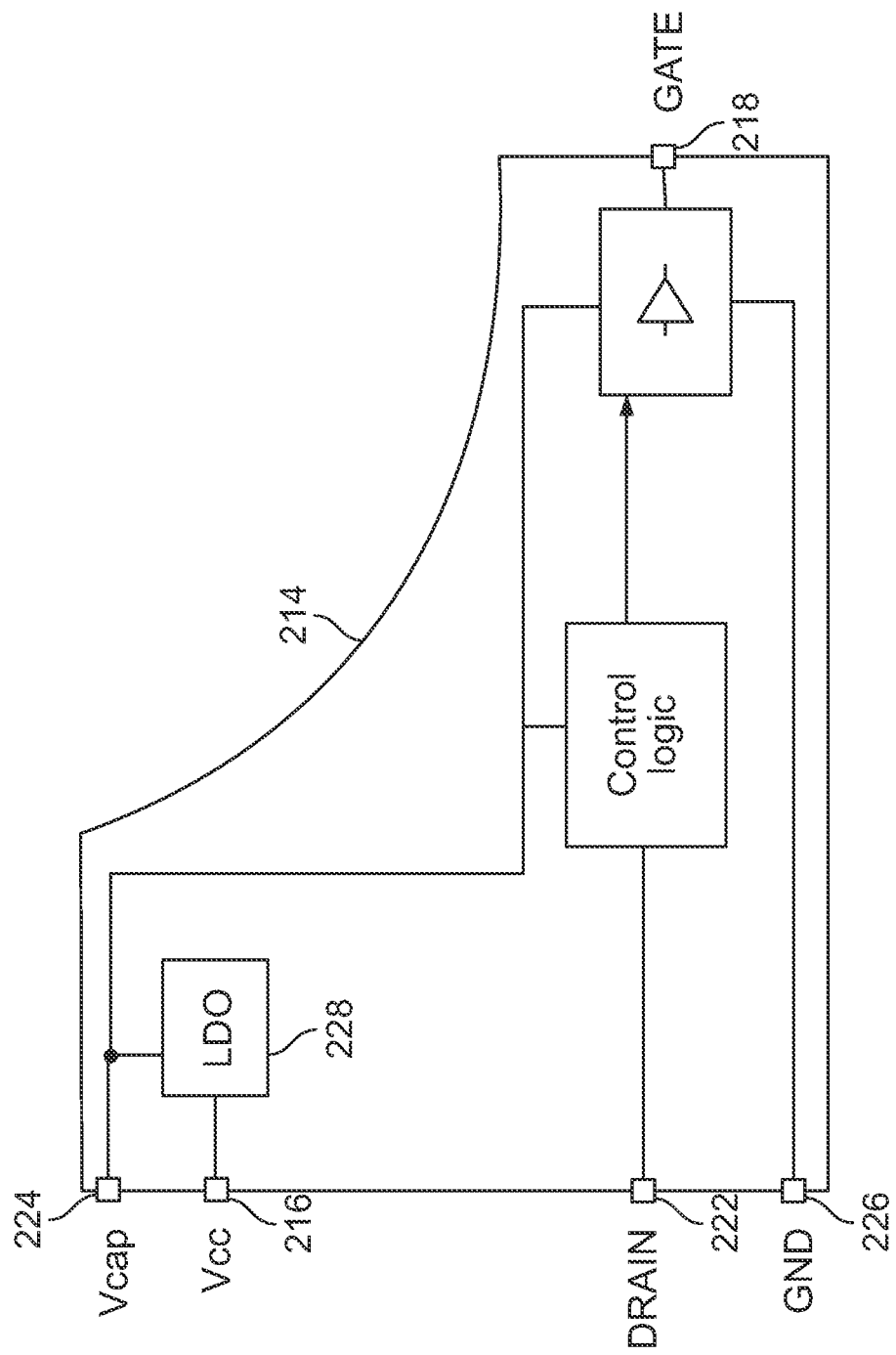
FIGS. 4A and 4B are block diagrams of portions of a controller of the power supply of FIG. 3.
Figure 4B:
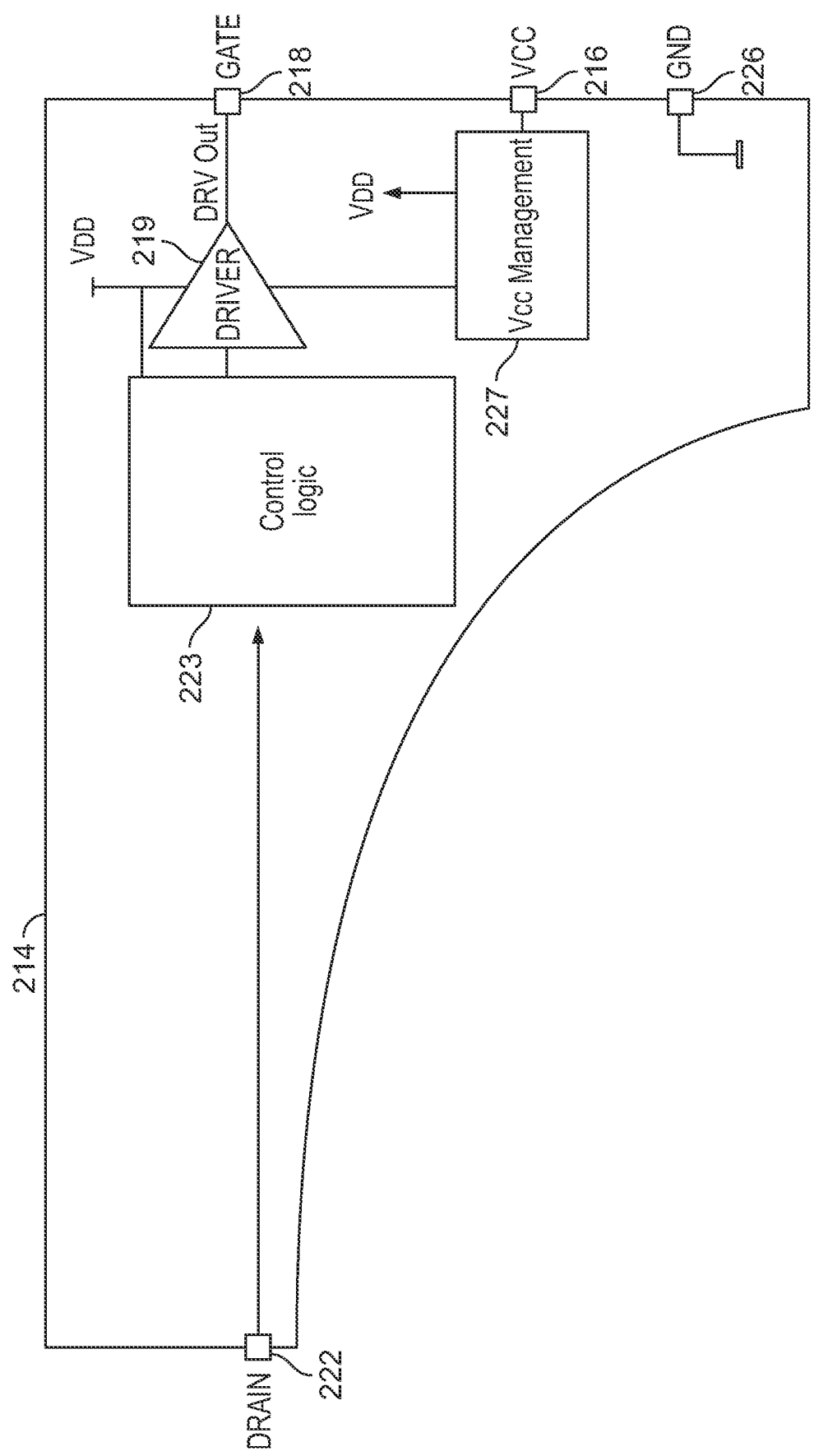

FIGS. 4A and 4B illustrate internal wiring diagrams of portions of the controller 214. As shown in FIG. 4A, the controller 214 includes a drain terminal 222, a capacitor supply terminal 224, and a ground terminal 226. A low-dropout (LDO) regulator 228 is coupled between the supply voltage terminal 216 and the capacitor supply terminal 224.

The LDO regulator 228 can supply a stable voltage at the capacitor supply terminal 224 for internal circuitry of the controller 214. For example, the LDO regulator 228 can convert a supply voltage at the supply voltage terminal 216 to a stable output at the capacitor supply terminal 224 for a wide range of DC output voltage values, so the capacitor supply terminal 224 can provide a stable operating voltage (e.g., about 5 V, 12 V, etc.) for proper operation of internal circuitry of the controller 214.

As shown in FIG. 4B, the controller 214 includes a control logic 223 and a driver 219 coupled between the drain terminal 222 and the gate terminal 218. A bias management control 227 is coupled between the supply voltage terminal 216 and the driver 219. The controller 214 may be similar to the controller 114 of FIG. 1, but the controller 214 does not include a pulse linear regulator.

Figure 5:
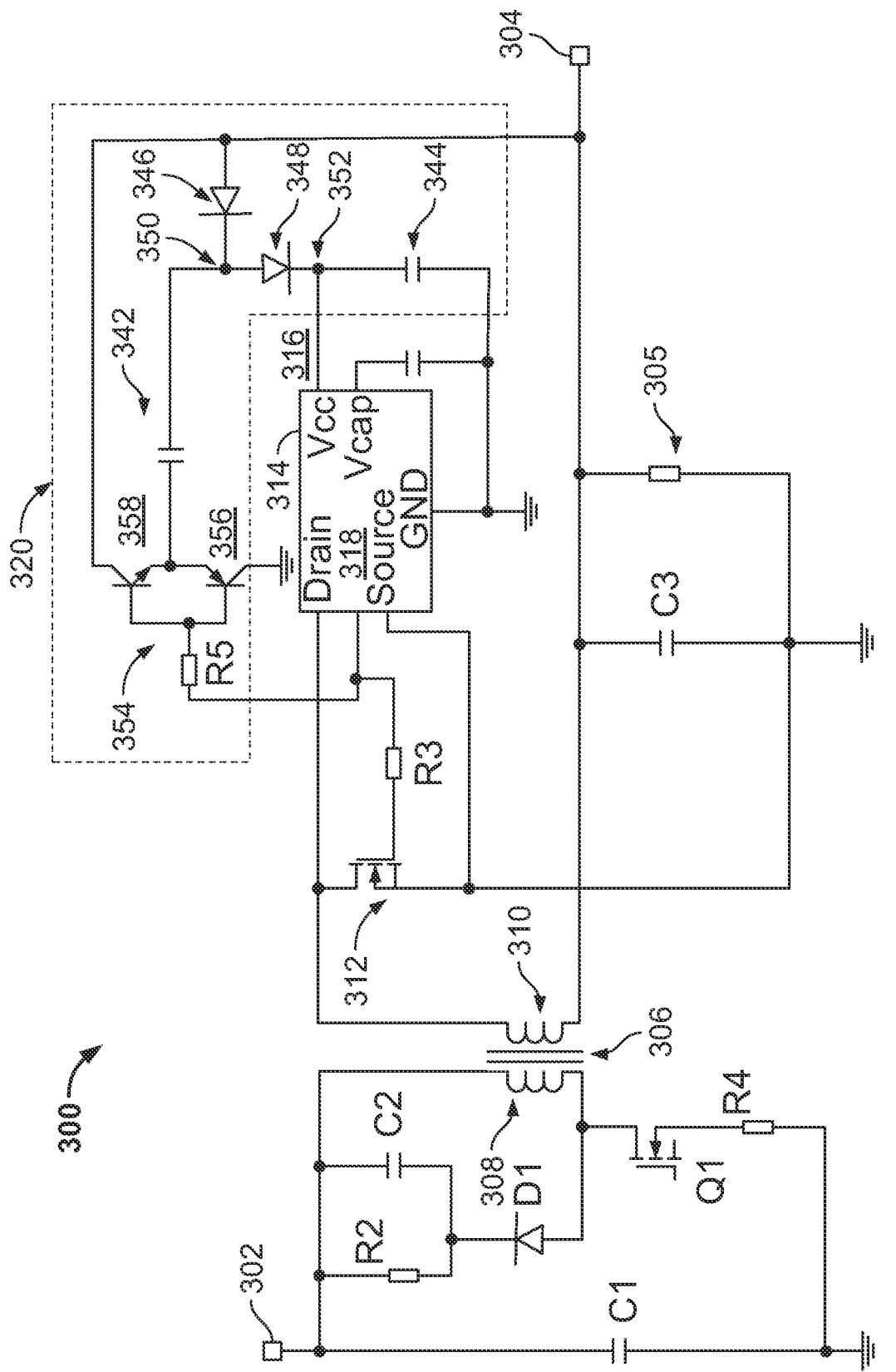
FIG. 5 is a circuit diagram of a switched-mode power supply including a buffer, according to another example embodiment of the present disclosure.

A switched-mode power supply according to another example embodiment of the present disclosure is illustrated in FIG. 5 and indicated generally by reference number 300. The power supply 300 includes an input 302, an output 304 for supplying a DC output voltage to a load 305, and a transformer 306 coupled between the input 302 and the output 304. The transformer 306 includes a primary winding 308 and a secondary winding 310.

The power supply 300 also includes a synchronous rectifier 312 and a controller 314 (e.g., a synchronous rectifier controller, a secondary controller, etc.). The controller 314 includes a gate terminal 318 coupled to supply a control signal to a gate of the synchronous rectifier 312, to selectively conduct current through the secondary winding 310 of the transformer 306.

As shown in FIG. 5, a circuit 320 is coupled between the gate terminal 318 of the controller 314, a supply voltage terminal 316 (e.g., Vcc) of the controller 314, and the output 304. The circuit 320 can supply power from the gate terminal 318 and the output 304 to the voltage supply terminal 316 of the controller 314. The circuit 320 may be referred to as a voltage supply circuit.

The circuit 320 includes two capacitors 342 and 344, two diodes 346 and 348, and two electrical nodes 350 and 352. The circuit 320 also includes a buffer 354 having two switches 356 and 358. Although the switches 356 and 358 are illustrated as bipolar-junction transistors (BJTs), other embodiments may include MOSFETs, etc. The buffer 354 is coupled between the capacitor 342, the gate terminal 318, and the output 304.

An anode of the diode 346 is coupled to receive the DC output voltage at the output 304, and the capacitor 342 is coupled to receive the gate control signal from the gate terminal 318 at a first terminal of the capacitor 342, via the buffer 354. An electrical node 350 is defined between the other terminal of the capacitor 342 and the cathode of the diode 346.

An anode of the diode 348 is coupled with the electrical node 350, and another electrical node 352 is defined between a cathode of the second diode 348, the supply voltage terminal 316 of the controller 314, and a first terminal of the capacitor 344. Another terminal of the capacitor 344 is coupled with a ground potential.

In the power supply 300, the controller 314 may be supplied by a pulse linear regulator (not shown) via a voltage at a drain of the synchronous rectifier 312. At this stage, the gate terminal 318 of the controller 314 starts to drive the synchronous rectifier 312, which may be a metal-oxide semiconductor field-effect transistor (MOSFET), etc.

When the control signal at the gate terminal 318 has a logical low value, the diode 346 is forward biased and the capacitor 342 charges through the diode 346. The capacitor 342 can charge up to substantially the same voltage as the DC output voltage at the output 304, minus a forward voltage drop across the diode 346 and a saturation voltage of switch 356.

When the control signal at the gate terminal 318 has a logical high value, the diode 346 is reverse biased and blocks discharging of the capacitor 342. At the same time, the diode 348 is forward biased and allows the capacitor 344 to charge. The capacitor 344 charges up to a combined voltage of double the DC output voltage (e.g., due to the buffer 354), minus the forward voltage drops across diodes 346 and 348 and the saturation voltages of switches 356 and 358.

This process may continue in a cycle until the supply voltage supplied to the supply voltage terminal 316 reaches an operating supply voltage value of the controller 314. At that point, the pulse linear regulator may be disabled to minimize power loss during operation of the power supply 300.

The power supply 300 optionally includes an input capacitor C1 coupled with the input 302, and an output capacitor C3 coupled with the output 304. The power supply 300 also includes other optional components including a primary switch Q1, a diode D1, capacitors C2 and C8, and resistors R2 and R3. In other embodiments, the power supply 300 may include more or less circuit components, components in different circuit arrangements, etc.

Figure 6:
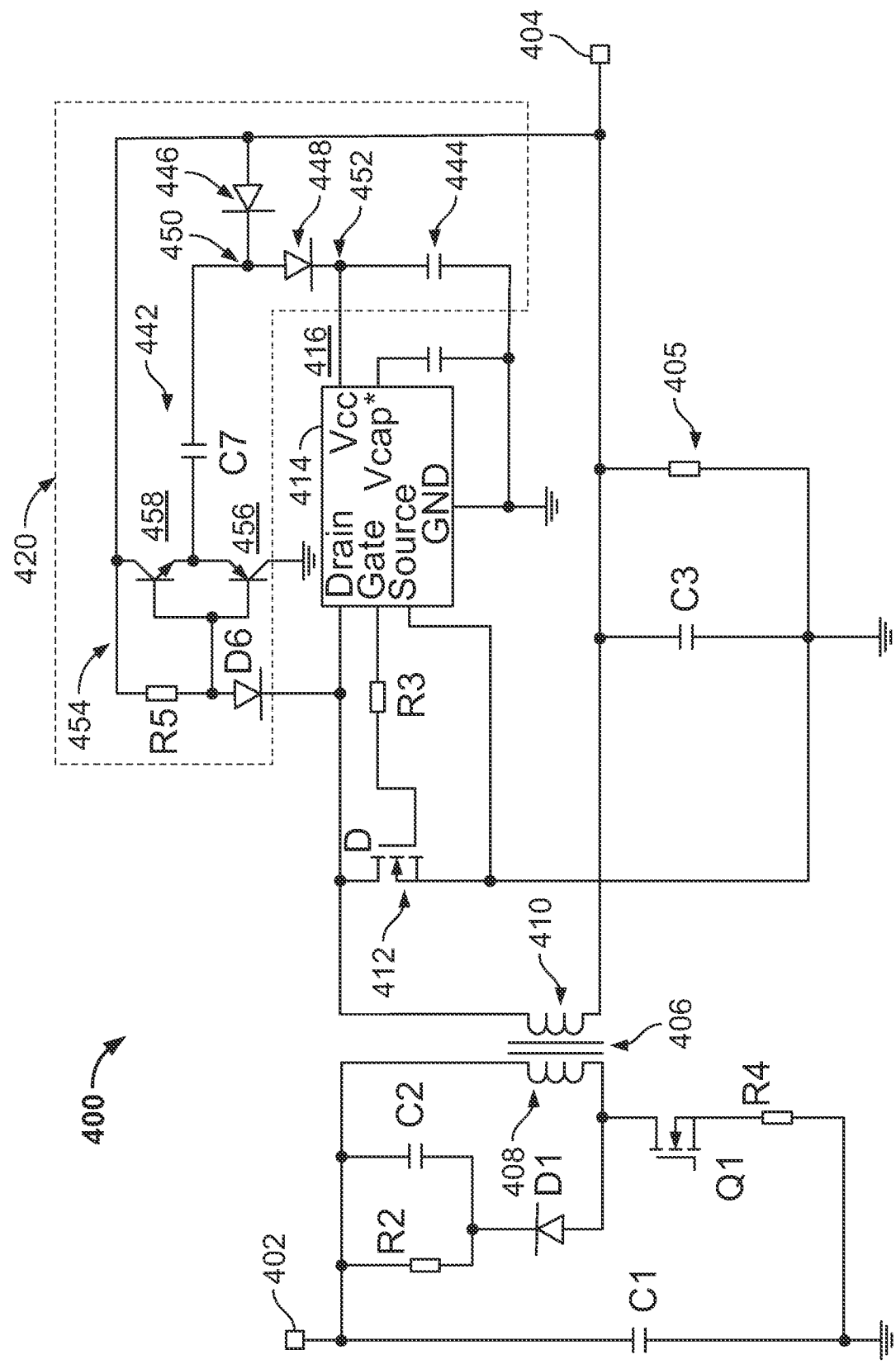
FIG. 6 is a circuit diagram of a switched-mode power supply including a buffer coupled between a drain of a synchronous rectifier and a supply voltage terminal of a controller, according to yet another example embodiment of the present disclosure.

A switched-mode power supply according to another example embodiment of the present disclosure is illustrated in FIG. 6 and indicated generally by reference number 400. The power supply 400 includes an input 402, an output 404 for supplying a DC output voltage to a load 405, and a transformer 406 coupled between the input 402 and the output 404. The transformer 406 includes a primary winding 408 and a secondary winding 410.

The power supply 400 also includes a synchronous rectifier 412 and a controller 414 (e.g., a synchronous rectifier controller, a secondary controller, etc.). The controller 414 includes a gate terminal 418 coupled to supply a control signal to a gate of the synchronous rectifier 412, to selectively conduct current through the secondary winding 410 of the transformer 406.

As shown in FIG. 6, a circuit 420 is coupled between the drain terminal (D) of the controller 414, a supply voltage terminal 416 (e.g., Vcc) of the controller 414, and the output 404. The circuit 420 can supply power from the drain terminal (D) of the synchronous rectifier 412 and the output 404 to the supply voltage terminal 416 of the controller 414. The circuit 420 may be referred to as a voltage supply circuit.

The circuit 420 includes two capacitors 442 and 444, two diodes 446 and 448, and two electrical nodes 450 and 452.

The circuit 420 also includes a buffer 454 having two switches 456 and 458. Although the switches 456 and 458 are illustrated as bipolar-junction transistors (BJTs), other embodiments may include MOSFETs, etc. The buffer 454 is coupled between the capacitor 442, the drain terminal (D) of the synchronous rectifier 412, and the output 404.

In the power supply 400, the controller 414 may not include a pulse linear regulator. At this stage, the synchronous rectifier 412 may operate in a diode mode when there is no supply bias for the controller 414. A supply voltage for the controller 414 may be established when the drain terminal (e.g., node) (D) of the synchronous rectifier 412 is switching and an output starts to rise.

When the drain terminal (D) has a logical low value, the diode 446 is forward biased and the capacitor 442 charges through the diode 446. The capacitor 442 can charge up to substantially the same voltage as the DC output voltage at the output 404, minus a forward voltage drop across the diode 446 and a saturation voltage of switch 456.

When the drain terminal (D) has a logical high value, the diode 446 is reverse biased and blocks discharging of the capacitor 442. At the same time, the diode 448 is forward biased and allows the capacitor 444 to charge. The capacitor 444 charges up to a combined voltage of double the DC output voltage (e.g., due to the buffer 454), minus the forward voltage drops across diodes 446 and 448 and the saturation voltages of switches 456 and 458.

This process may continue in a cycle until the supply voltage supplied to the supply voltage terminal 416 reaches an operating supply voltage of the controller 414. At this point, the synchronous rectifier 412 may be turned on and off normally to achieve synchronous rectification, which can reduce power loss during operation.

The power supply 400 optionally includes an input capacitor C1 coupled with the input 402, and an output capacitor C3 coupled with the output 404. The power supply 400 also includes other optional components including a primary switch Q1, diodes D1 and D6, capacitors C2 and C8, and resistors R2, R3 and R5. In other embodiments, the power supply 400 may include more or less circuit components, components in different circuit arrangements, etc.

As described herein, the example controllers may include a microprocessor, microcontroller, integrated circuit, digital signal processor, etc., which may include memory. The controllers may be configured to perform (e.g., operable to perform, etc.) any of the example processes described herein using any suitable hardware and/or software implementation. For example, the controllers may execute computer-executable instructions stored in a memory, may include one or more logic gates, control circuitry, etc.

According to another example embodiment, a method of supplying power in a switched-mode power supply is disclosed. The power supply includes an input, an output, a transformer coupled between the input and the output, a synchronous rectifier including a drain terminal, a controller including a supply voltage terminal and a gate terminal, and a circuit coupled between the supply voltage terminal of the controller and at least one of the gate terminal of the controller and the drain terminal of the synchronous rectifier.

The method includes supplying, via the gate terminal of the controller, a control signal to a gate of the synchronous rectifier to selectively conduct current through the secondary winding of the transformer. The method also includes supplying, via the circuit, power from the gate terminal of the controller or the drain terminal of the synchronous rectifier to the supply voltage terminal of the controller.

The circuit may be coupled between the output and the supply voltage terminal of the controller, and the circuit may supply power from the output to the supply voltage terminal of the controller. When the controller includes a pulse linear regulator, the method can further include receiving, via the pulse linear regulator, a voltage from the drain of the synchronous rectifier and supplying a reduced voltage to the controller.

If the circuit includes two capacitors and two diodes, and the method may include charging a first one of the capacitors to the DC output voltage minus a forward voltage of a first one of the diodes when the control signal at the gate terminal of the controller has a logical low value. In that case, the method could also include charging a second one of the capacitors to the DC output voltage plus a voltage of the control signal minus forward voltages of the two diodes when the control signal at the gate terminal of the controller has a logical high value.

In some embodiments, the circuit may include a buffer coupled between a first one of the capacitors and at least one of the gate terminal of the controller and the drain of the synchronous rectifier. The buffer can include two switches. The method may include charging the first capacitor to the DC output voltage minus a forward voltage of a first one of the diodes and a saturation voltage of one of buffer switches when the control signal at the gate terminal of the controller has a logical low value. In that case, the method may include charging a second one of the capacitors to double the DC output voltage minus forward voltages of the two diodes and saturation voltages of the two buffer switches when the control signal at the gate terminal of the controller has a logical high value.

Supplying a reduced voltage to the controller via the pulse linear regulator may include supplying the reduced voltage to the controller when a voltage at the supply voltage terminal of the controller is below an operating supply voltage of the controller. The method may further include disabling the pulse linear regulator when the voltage at the supply voltage terminal is at or above the operating supply voltage of the controller.

In another example embodiment, a voltage supply circuit for a controller in a switched-mode power supply is disclosed. The power supply includes an input, an output, a transformer coupled between the input and the output, and a synchronous rectifier having a drain terminal. The controller includes a supply voltage terminal and a gate terminal.

The supply voltage supply circuit includes a buffer having two switches, first and second diodes, and first and second capacitors. The buffer is coupled to receive power from the gate terminal of the controller or the drain terminal of the synchronous rectifier. The first capacitor includes a first terminal and a second terminal, and the second terminal is coupled to the gate terminal of the controller to receive a control signal from the controller. The first diode includes a cathode and an anode, and the anode is coupled to receive power from the output. A first electrical node is defined between the cathode of the first diode and the first terminal of the first capacitor. The second diode includes a cathode and an anode, and the anode of the second diode is coupled with the first electrical node. The second capacitor includes a first terminal and a second terminal, and the second terminal of the second capacitor is coupled with a ground potential. A second electrical node is defined between the cathode of the second diode, the supply voltage terminal of the controller, and the first terminal of the second capacitor.

Example embodiments described herein may provide one or more (or none) of the following advantages: reduced power loss, increased efficiency, reduced part counts, less PCB space requirements, reduced cost, no requirement of an additional auxiliary supply winding on a transformer, etc.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A switched-mode power supply comprising:
an input for receiving an input voltage from a voltage source;
an output for supplying a DC output voltage to a load;
a transformer coupled between the input and the output, the transformer having a primary winding and a secondary winding;
a synchronous rectifier coupled to selectively conduct current through the secondary winding of the transformer, the synchronous rectifier comprising a source, a gate and a drain terminal;
a controller comprising a supply voltage terminal to receive a supply voltage for the controller, and a gate terminal to supply a control signal to the gate of the synchronous rectifier; and
a circuit coupled between the supply voltage terminal of the controller and at least one of the gate terminal of the controller and the drain terminal of the synchronous rectifier to supply power from the gate terminal of the controller or the drain terminal of the synchronous rectifier to the supply voltage terminal of the controller, the circuit comprising:
a first capacitor; and
a buffer coupled between a first terminal of the first capacitor, the output and the gate terminal of the controller, the buffer comprising at least two buffer switches.

2. The power supply of claim 1, wherein the circuit is coupled between the output and the supply voltage terminal to supply power from the output to the supply voltage terminal of the controller.

3. The power supply of claim 1, wherein the controller comprises a pulse linear regulator coupled to receive a voltage from the drain of the synchronous rectifier and supply a reduced voltage to the controller.

4. The power supply of claim 3, wherein the pulse linear regulator is configured to supply the reduced voltage to the controller in response to a voltage at the supply voltage terminal of the controller being below an operating supply voltage of the controller, and the controller is configured to disable the pulse linear regulator in response to the voltage at the supply voltage terminal being at or above the operating supply voltage value of the controller.

5. The power supply of claim 1, wherein the circuit further comprises a first diode coupled between a second terminal of the first capacitor and the output; and
wherein the first capacitor is coupled to charge to the DC output voltage minus a forward voltage of the first diode and minus a saturation voltage of one of the buffer switches in response to the control signal at the gate terminal of the controller having a logical low value.

6. The power supply of claim 5, wherein the circuit further comprises:
a second diode having first and second terminals, the first terminal coupled with the second terminal of the first capacitor; and
a second capacitor having:
a first terminal coupled with the second terminal of the second diode; and
a second terminal coupled with a ground potential;
wherein the second capacitor is coupled to charge to double the DC output voltage minus forward voltages of the first and second diodes and minus saturation voltages of the two buffer switches in response to the control signal at the gate terminal of the controller having a logical high value.

7. The power supply of claim 1, wherein the control signal comprises a pulse-width modulated (PWM) signal.

8. The power supply of claim 1, wherein the controller comprises a capacitor supply terminal and a low-dropout regulator coupled between the supply voltage terminal and the capacitor supply terminal to supply a stable voltage at the capacitor supply terminal for internal circuitry of the controller.

9. A method of supplying power in a switched-mode power supply, the switched-mode power supply comprising an input, an output, a transformer coupled between the input and the output, a synchronous rectifier comprising a drain terminal, a synchronous rectifier controller comprising a supply voltage terminal and a gate terminal, and a circuit coupled between the supply voltage terminal of the controller and the gate terminal of the controller, the method comprising:
supplying, via the gate terminal of the controller, a control signal to a gate of the synchronous rectifier to selectively conduct current through the secondary winding of the transformer;
supplying, via the circuit, power from the gate terminal of the controller or the drain terminal of the synchronous rectifier to the supply voltage terminal of the controller; and
wherein the circuit comprises a first capacitor, a first diode, and a buffer comprising two switches, the buffer coupled between a first terminal of the first capacitor and the gate terminal of the controller; and
wherein the method further comprises charging the first capacitor to the DC output voltage minus a forward voltage of the first diode and minus a saturation voltage of one of buffer switches in response to the control signal at the gate terminal of the controller having a logical low value.

10. The method of claim 9, wherein the circuit further comprises:
a second diode having first and second terminals, the first terminal coupled with a second terminal of the first capacitor; and
a second capacitor having:
a first terminal coupled with the second terminal of the second diode; and
a second terminal coupled with a ground potential;
wherein the method further comprises charging the second capacitor to double the DC output voltage minus forward voltages of the first and second diodes and minus saturation voltages of the two buffer switches in response to the control signal at the gate terminal of the controller having a logical high value.

11. The method of claim 9, wherein the circuit is coupled between the output and the supply voltage terminal of the controller to supply power from the output to the supply voltage terminal of the controller.

12. The method of claim 9, wherein the controller further comprises a pulse linear regulator; and
wherein the method further comprises:
receiving, via the pulse linear regulator, a voltage from the drain of the synchronous rectifier; and
supplying a reduced voltage to the controller.

13. The method of claim 12 further comprising supplying the reduced voltage to the controller in response to a voltage at the supply voltage terminal of the controller being below an operating supply voltage of the controller.

14. The method of claim 13 further comprising disabling the pulse linear regulator in response to the voltage at the supply voltage terminal being at or above the operating supply voltage value of the controller.

15. A method of supplying power in a switched-mode power supply, the switched-mode power supply comprising an input, an output, a transformer coupled between the input and the output, a synchronous rectifier comprising a drain terminal, a synchronous rectifier controller comprising a supply voltage terminal and a gate terminal, and a circuit coupled between the supply voltage terminal of the controller and the drain of the synchronous rectifier, the method comprising:
supplying, via the gate terminal of the controller, a control signal to a gate of the synchronous rectifier to selectively conduct current through the secondary winding of the transformer; and
supplying, via the circuit, power from the gate terminal of the controller or the drain terminal of the synchronous rectifier to the supply voltage terminal of the controller;
wherein the circuit comprises a first capacitor, a first diode, and a buffer comprising two switches, the buffer coupled between a first terminal of the first capacitor and the drain of the synchronous rectifier; and
wherein the method further comprises charging the first capacitor to the DC output voltage minus a forward voltage of the first diode and minus a saturation voltage of one of buffer switches in response to the control signal at the gate terminal of the controller having a logical low value.

16. The method of claim 15, wherein the circuit further comprises:
a second diode having first and second terminals, the first terminal coupled with a second terminal of the first capacitor; and
a second capacitor having:
a first terminal coupled with the second terminal of the second diode; and
a second terminal coupled with a ground potential;
wherein the method further comprises charging the second capacitor to double the DC output voltage minus forward voltages of the first and second diodes and minus saturation voltages of the two buffer switches in response to the control signal at the gate terminal of the controller having a logical high value.

17. The method of claim 15, wherein the circuit is coupled between the output and the supply voltage terminal of the controller to supply power from the output to the supply voltage terminal of the controller.

18. The method of claim 15, wherein the controller further comprises a pulse linear regulator; and
wherein the method further comprises:
receiving, via the pulse linear regulator, a voltage from the drain of the synchronous rectifier; and
supplying a reduced voltage to the controller.

19. The method of claim 18 further comprising supplying the reduced voltage to the controller in response to a voltage at the supply voltage terminal of the controller being below an operating supply voltage of the controller.

20. The method of claim 19 further comprising disabling the pulse linear regulator in response to the voltage at the supply voltage terminal being at or above the operating supply voltage value of the controller.

* * * * *